FABRICATION OF SEMICONDUCTIVE DEVICES

Filed May 22, 1967

INVENTOR.
ROBERT L. LUCE
BY
Harry W. Hargis III
AGENT

United States Patent Office 3,469,308
Patented Sept. 30, 1969

3,469,308
FABRICATION OF SEMICONDUCTIVE DEVICES

Robert L. Luce, North Wales, Pa., assignor to Philco-Ford Corporation, Philadelphia, Pa., a corporation of Delaware Filed May 22, 1967, Ser. No. 639,986
Int. Cl. H01l 7/00; B23k 31/02
U.S. Cl. 29—589 5 Claims

ABSTRACT OF THE DISCLOSURE

A process for heat treating the aluminum metal contact layer and underlying surface portions of a silicon transistor or microcircuit. The aluminum is alloyed, or sintered, with contacting underlying regions of the silicon by raising the temperature of the region to a value (e.g., about 400° C.) substantially below the silicon-aluminum eutectic temperature, through application of a quantity of heat for a relatively short period (e.g., about 2 to 4 seconds) to the side of the body of silicon opposite to the aluminized side.

CROSS REFERENCE TO RELATED DISCLOSURE

The present invention is directed to improvements in the process disclosed and claimed in the copending joint application of the present inventor and Stephen A. Idzik, Ser. No. 615,404, filed Feb. 13, 1967, and assigned to the assignee of the present invention. The improvements relate to a mode of accomplishing sintering of the metal contact layer with the underlying semiconductive material.

BACKGROUND OF THE INVENTION

This invention relates to semiconductive devices, and more particularly to an improved method for making electrical connections in semiconductive devices.

In a typical microcircuit device in which ohmic contact is to be made with a body of silicon, openings are etched in a coating of silicon oxide overlying the body, and a layer of aluminum is deposited, for example by evaporation, over the coating and the exposed silicon. Heat is then applied to the assembly to sinter the aluminum and the silicon, in achievement of both mechanical and electrical connection therebetween.

While processes heretofore known in the art have proven adequate in the fabrication of conventional planar devices, such processes have not proven satisfactory in the fabrication of devices whose dimensions have been scaled down considerably to improve their high frequency performance. For example, where emitter regions have been in the order of 2 microns thick, they are typically in the order of 0.3 micron thick in a high frequency device. When making sintered connections to diffused emitter regions of only about 0.3 micron in thickness, it is particularly important that the aluminum penetrate uniformly into the emitter region, and not completely therethrough into the underlying region of silicon. It is therefore a general objective of this invention to provide an improved process for sintering which achieves a desired small degree of penetration in a semiconductive device.

SUMMARY OF THE INVENTION

A preferred practice of the invention involves treatment of a silicon wafer having a layer of silicon oxide provided with openings, and a layer of aluminum extending over surface portions of the layer of oxide and of the exposed silicon. Heat is applied rapidly to the opposite side of the wafer to elevate the temperature sufficiently to nucleate a silicon-aluminum interaction in achievement of sintering, whereby the aluminum and the silicon are both mechanically and electrically bonded.

Advantageously, application of heat to the opposite side of the body of silicon results in concentration of heat in the regions where the aluminum directly overlies the silicon, to the exclusion of substantial heat flow into portions of the aluminum extending over the oxide layer, due to the thermal impedance of the oxide.

The foregoing as well as other objectives and advantages of the invention will be more fully understood from a consideration of the following description taken in light of the accompanying drawing.

BRIEF DESCRIPTION OF THE DRAWING

FIGURES 1A, 1B through 5A, 5B are greatly enlarged plan and sectional views of a semiconductive device at separate, sequential stages of manufacture leading up to the process steps characteristic of the present invention;

DESCRIPTION OF THE PREFERRED PRACTICE OF THE INVENTION

Figure 1A:
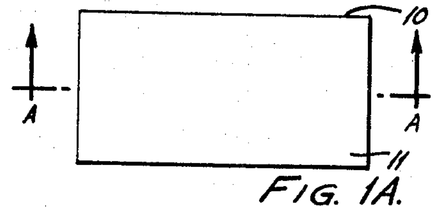
Figure 1B:
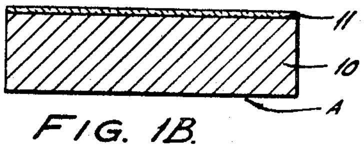
Figure 2A:
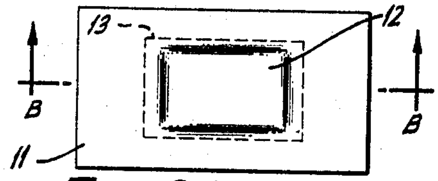
Figure 2B:
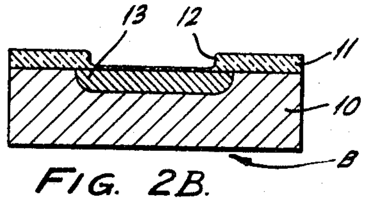

With more detailed reference to the drawing, and as shown in FIGURES 1A, 1B, a surface of an N-type silicon wafer 10 is treated to form an insulating film or layer 11 of silicon oxide. This film may be produced in accordance with known practice, for example by inserting wafer 11 into a furnace maintained at approximately 1200° C. and passing 100 cc. per minute of dry oxygen through the furnace. With reference to FIGURES 2A, 2B, oxide film 11 is formed into a mask by making an opening 12 therethrough. The opening may be made by any of a number of suitable photoengraving processes known in the art.

Figure 3A:
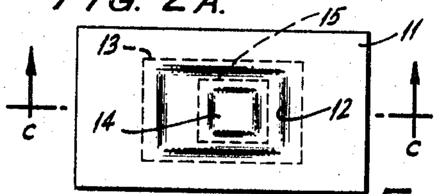
Figure 3B:
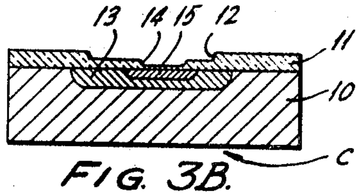

As a further step in the production of a device, an acceptor impurity such as boron is diffused, from a $B_2O_3$ source in an oxidizing atmosphere, into wafer 10 through opening 12 to produce a P-type region 13 in the wafer. During the diffusion of the impurity into the wafer, additional silicon oxide is formed so that, as indicated in FIGURES 2A, 2B, the entire wafer surface is covered by oxide layer 11. In a similar manner, as shown in FIGURES 3A, 3B, an N-type region 15 is formed in the P-type region 13 by diffusing a donor impurity such as phosphorous, from a phosphorous oxychloride source, through an opening 14 in the oxide layer 11.

Figure 4A:
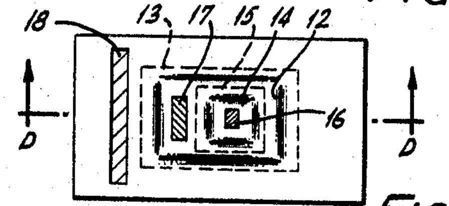
Figure 4B:
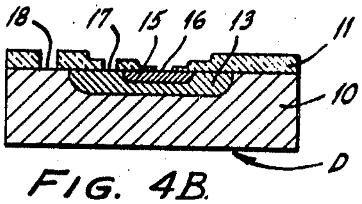
Figure 5A:
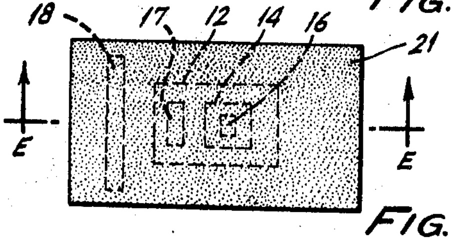
Figure 5B:
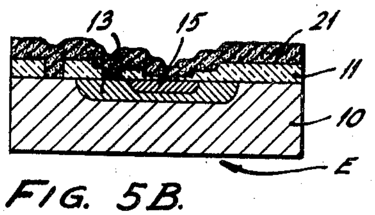

As shown in FIGURES 4A, 4B, portions of the oxide film 11 are then removed to expose a contact area for each of the regions 13 and 15, and a nondoped region. These areas are designated by numerals 16, 17, and 18, respectively, and comprise the transistor emitter, base, and collector areas. The entire surface of the wafer is then coated with a film 21 of pure aluminum, as shown in FIGURES 5A, 5B. Aluminum film 21 may be formed by vacuum coating in a conventional bell-jar evaporator (not shown).

Aluminum film 21 is then sintered to the contact areas 16, 17 and 18 at a temperature well below the silicon-aluminum eutectic temperature. It is this process for making ohmic connection between the aluminum and the silicon contact areas to which the present invention is directed.

While the term wafer has been applied to the single device 10 as illustrated, it will be understood that a wafer comprising a single crystal of silicon, and having a large number of devices of the kind shown in the drawing, may be treated in accordance with the invention. After treatment, the wafer may be subjected to the conventional procedure of testing, scribing, and fracturing into dice each having the appearance of the wafer or device 10.

Figure 6:
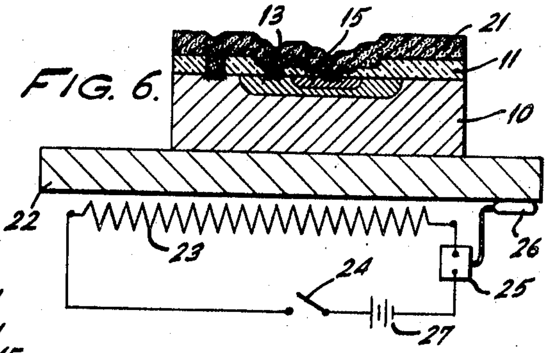
FIGURE 6 illustrates, in section, a device as shown in FIGURES 5A, 5B and, somewhat diagrammatically, apparatus utilized in carrying out the method contemplated by the invention.

In carrying out the process contemplated by the invention, and with reference to FIGURE 6, wafer 10 is disposed atop a hot plate apparatus preferably comprising a thermally conductive plate 22 of considerably greater thermal mass than the wafer, and a resistance heater 23 disposed in thermal exchange relation with plate 22. Heater 23 is controlled by an energizing switch 24 and a thermostatic element 25 including a sensing device 26 for plate 22. A source 27 of electrical energy for the heater is provided in series with the aforementioned elements.

The process contemplated by the invention involves sintering aluminum 21 and contact areas 16, 17, and 18 of the silicon by quick, preferential heating of these areas through application of heat from energized hot plate 22 to the lower side of wafer 10. A preferred operating cycle comprises heating wafer 10 to a temperature of about 400° C. for a period of about 2 to 4 seconds, with temperature control 25 insuring maintenance of the proper wafer temperature. In automatic achievement of the foregoing cycle of operation the wafers may be slid onto the hot plate, over its surface, then onto an exit chute. The time for traversal of the hot plate would then be adjusted to attain the required cycle.

I have found that the device temperature should exceed about 375° to achieve interaction. Rapid heating produces uniform nucleation followed by the very small degree of penetration contemplated by the invention. Based on a 375° C. temperature, and starting with a device at a room temperature of about 25° C., an average heating rate achieving the desired aluminum-silicon reaction would be about 175° C./sec., which heating program can be established empirically. In such determination, the temperature of the hot plate will remain substantially constant due to the relatively large mass of the hot plate as compared with the mass of the wafer. For a desired treatment temperature, the hot plate would be operated at or just slightly above such temperature. Due to the relatively low thermal mass of the wafer, its temperature would first rise rapidly, then taper off as it approached the temperature limit defined by the operating temperature of the hot plate. In view of this characteristic relationship, the above described heating rate is considered to be an average rate, so that in a major portion of the heating time period (e.g., 2 to 4 seconds) the temperature of the wafer will be closely approaching the operating temperature.

Figure 7:
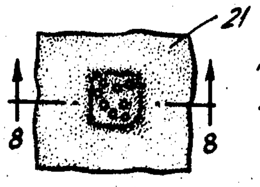
FIGURE 7 is a further enlarged plan view of a portion of the device shown in FIGURE 6, and illustrating desirable structural features attained by the method of the present invention.
Figure 8:
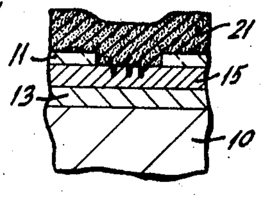
FIGURE 8 is a sectional view taken along the line designated by the arrows 8—8 applied to FIGURE 7.

When heat is applied to the lower side of wafer 10, the portions of aluminum 21 in contact with areas 16, 17, and 18 of the silicon are heated first, and there is very little heating of the aluminum that overlies oxide 11 because of the thermal insulating effect of the oxide layer. As is exemplified by the showing of the contact area 16 in FIGURES 7 and 8, the rapid temperature rise achieves substantially uniform nucleation of the silicon-aluminum reaction over the entire areas of the contacts 16, 17, and 18. As a result of this uniform nucleation of the silicon-aluminum reaction, the aluminum combines relatively rapidly with the silicon to the desired restricted depth. For example, there is achieved substantially uniform penetration of about 0.1 to 0.2 micron in a diffused emitter of about 0.3 micron in thickness.

The nature of the aluminum-silicon reaction is not fully understood, but is considered to be a solid state solution reaction inasmuch as the lowest liquidus temperature is the eutectic temperature of 577° C. Since no liquid phase is involved, the interaction is referred to as sintering. The rapid heating prevents the reaction from being localized.

Figure 9:
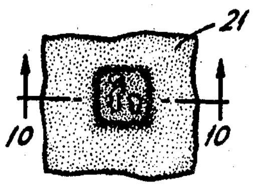
FIGURES 9 and 10 are views similar to FIGURES 7 and 8, respectively, but showing structural defects that the method of the present invention overcomes.
Figure 10:
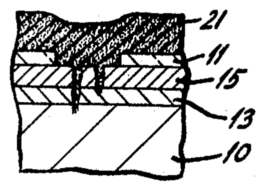

While not certain, it appears further that the solid solution interaction causes the silicon to be dissolved into the aluminum in a relative volume that is a function of temperature. Also, it is known that the silicon diffuses relatively rapidly through the aluminum, and that once the aluminum contains silicon, the interaction is inhibited. In the prior art, using the relatively slow rates of heat application characteristic of that art, the first point to nucleate supplied silicon to the aluminum. The silicon tended to diffuse through the aluminum, thereby preventing further nucleation, and the uniform shallow penetration of the present invention was not achieved. In order to satisfy the volume equilibrium condition, the local point of nucleation, under slow heating conditions, supplied all of the silicon, with resultant very deep and isolated penetration of the silicon by the aluminum as is illustrated in FIGURES 9 and 10. Such deep penetration is disadvantageous and may even short circuit the various regions of the device.

Advantageously, the rapid heating method of the invention avoids these local reactions which penetrate deeply into the silicon, and instead achieves nucleation at many points through rapid heating. Since there are many points, none is capable of supplying sufficient silicon to create the very deep, undesirable penetrations as seen in FIGURES 9 and 10.

After the sintering operation, undesired portions of the aluminum film 21 are removed, using conventional etching techniques, to form the desired collector, base, and emitter contact leads (not shown). It will of course be understood that the aforementioned contact leads may be formed prior to the sintering process contemplated by the invention, since extra aluminum is not necessary to act as a sink for the diffusion of silicon.

The invention further achieves more reliable metallization because little, if any, silicon diffuses into regions of the aluminum metal layer not in direct contact with silicon, i.e., that aluminum which overlies the oxide layer 11. This substantial absence of diffusion is desirable, because silicon in the aluminum can cause an increased bulk resistivity which under high loading conditions can dissipate sufficient power to cause reaction of aluminum with the underlying oxide.

It will be appreciated that the method contemplated by the invention is particularly adapted for the fabrication of devices intended for use at relatively high frequencies. This is so because such devices characteristically are of such small dimensions that great care must be exercised not to sinter through the diffused layers, either transversely of or laterally beneath the oxide layer. The percent yield of devices fabricated according to the present invention has been high as compared to other known methods.

I claim:

1. In a process for making electrical connections to predetermined regions of one planar surface of a body of semiconductive material having opposed, substantially planar surfaces, the steps comprising: providing an oxide film coating on portions of said one surface other than said regions; coating both said regions and said oxide film coating with a thin film of metal; and sintering the metal with the underlying semiconductive material of said body in said regions, by applying heat rapidly to substantially the entire area of the opposite uncoated surface of said body, to elevate the temperature of said metal in the regions which are devoid of oxide film coating.

2. The process according to claim 1, and further characterized in that said metal is aluminum and said semiconductive material is silicon.

3. The process according to claim 2, and characterized further in that said temperature is elevated into a range from about 375° C. to about 400° C. and maintained in said range for a period of a few seconds.

4. The process according to claim 3 and, characterized further in that heat is applied at a rate effective to elevate the temperature of said body at about 175° C. per second.

5. The process according to claim 3, and characterized further in that said period comprises about 2 to 4 seconds.

References Cited

UNITED STATES PATENTS

| | | | |
|---|---|---|---|
| 2,750,541 | 6/1956 | Ohl | 29—572 X |
| 2,981,877 | 4/1961 | Noyce. | |
| 3,160,522 | 12/1964 | Heywang et al. | |
| 3,266,127 | 8/1966 | Harding et al. | 29—590 X |
| 3,362,851 | 1/1968 | Dunster | 29—590 X |

OTHER REFERENCES

"Solid State Electronics," October 1965, article entitled "Electrical Contacts to Silicon," pages 831–833.

IBM Tech. Disc. Bull., vol. 9, No. 6, November 1966, page 719.

PAUL M. COHEN, Primary Examiner

U.S. Cl. X.R.

29—472.9, 498